Figure 1:
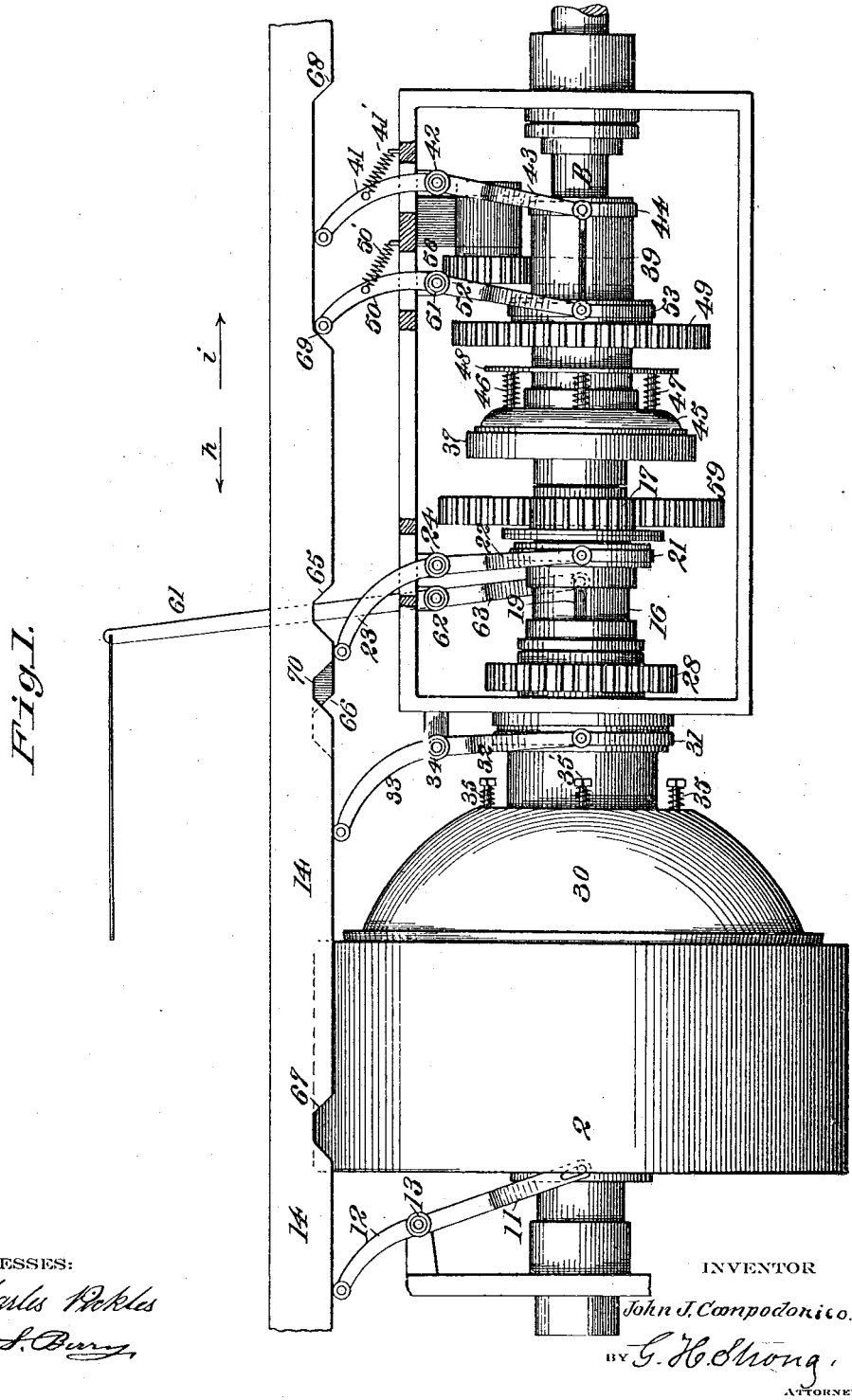

J. J. CAMPODONICO.
CHANGE SPEED TRANSMISSION-GEARING.
APPLICATION FILED JUNE 2, 1913.

1,120,903.

Patented Dec. 15, 1914.
2 SHEETS—SHEET 1.

WITNESSES:
Charles Pickles
R. S. Burry

INVENTOR
John J. Campodonico.
BY G. H. Strong,
ATTORNEY

J. J. CAMPODONICO.
CHANGE SPEED TRANSMISSION GEARING.
APPLICATION FILED JUNE 2, 1913.
1,120,903.
Patented Dec. 15, 1914.
2 SHEETS—SHEET 2.
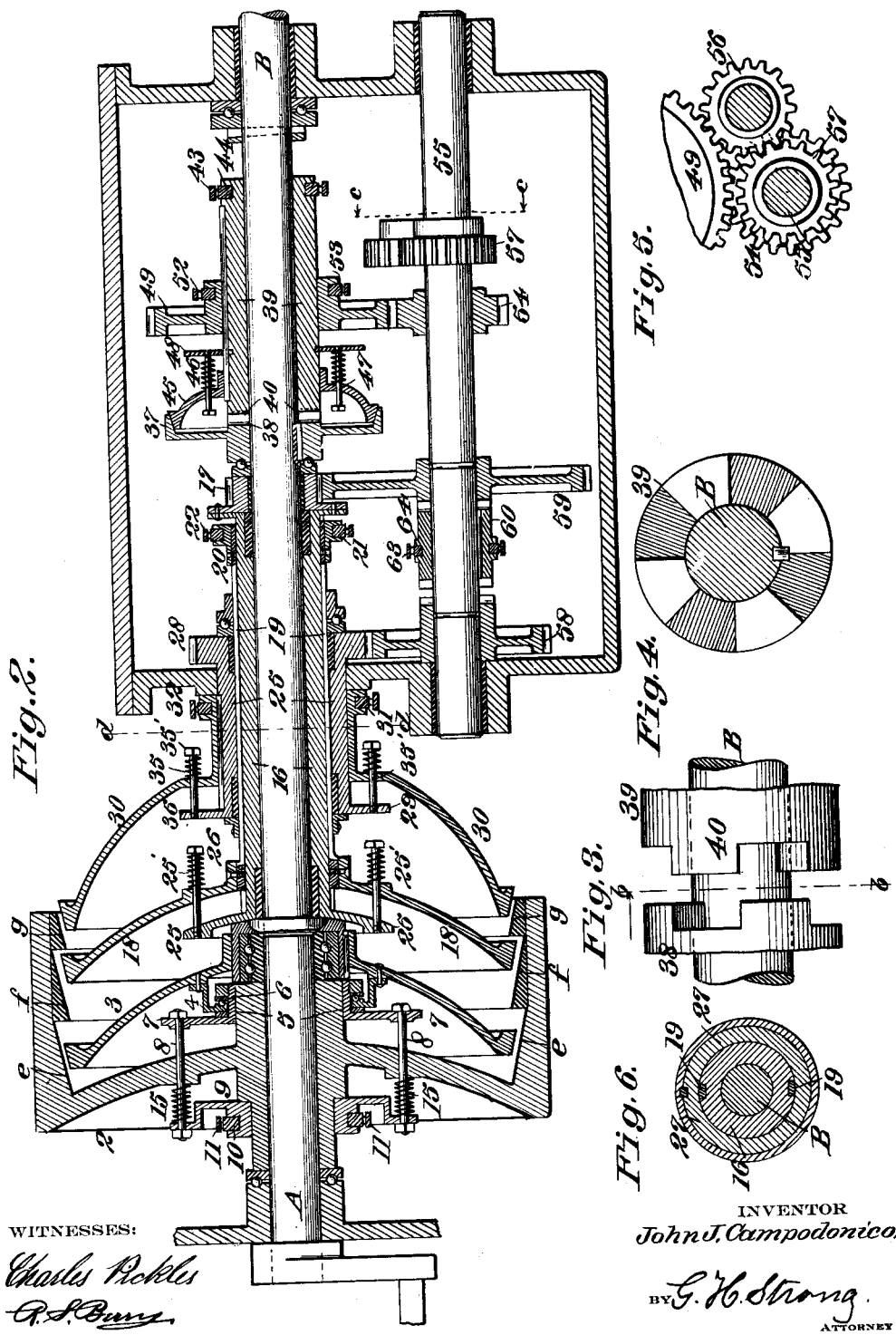
WITNESSES:
INVENTOR
John J. Campodonico.
BY G. H. Strong.
ATTORNEY

UNITED STATES PATENT OFFICE.

JOHN J. CAMPODONICO, OF STOCKTON, CALIFORNIA.

CHANGE-SPEED-TRANSMISSION GEARING.

1,120,903.  Specification of Letters Patent.  Patented Dec. 15, 1914.

Application filed June 2, 1913. Serial No. 771,143.

*To all whom it may concern:*

Be it known that I, JOHN J. CAMPODONICO, a citizen of the United States, residing at Stockton, in the county of San Joaquin and State of California, have invented new and useful Improvements in Change - Speed - Transmission Gearing, of which the following is a specification.

This invention relates to a change speed mechanism.

It is the object of this invention to provide a mechanism by which a driven shaft may be rotated at various speeds from a uniformly rotated drive shaft, which mechanism embodies a series of permanently meshed gear wheels and friction clutch members so constructed and arranged that the shifting of the transmission gearing in changing from one speed to another is obviated, thus preventing stripping of the gear teeth, as sometimes occurs in the ordinary shifting gear type of change speed transmission gearing, and rendering the mechanism practically noiseless in operation.

A further object is to provide a change speed mechanism of the above character which is simple in construction, compact, easily controlled, and so arranged and operated as to insure the throwing out of one speed before another is thrown in, and changing from one speed to another in definite order.

Further objects will appear hereinafter.

The invention primarily resides in a series of clutch members adapted to engage a fly wheel on a drive shaft, means for shifting the clutch members separately and independently of each other whereby one clutch member can be thrown into operable engagement with the fly-wheel at a time, means by which rotary motion can be imparted to the driven shaft through said clutch members, and means operating when the driven shaft is connected directly to the drive shaft by which the mechanism controlling the intermediate speed, low speed and reverse will be retained inoperative.

The invention further consists of the parts and the construction and combination of parts as hereinafter more fully described and claimed, having reference to the accompanying drawings, in which—

Figure 1 is a plan view of the invention with portions broken away and with the parts disposed in their neutral position. Fig. 2 is a vertical section and partial elevation. Fig. 3 is a fragmentary detail in side elevation showing the positive clutch member in its disengaged position. Fig. 4 is a section in elevation on the line $b$—$b$ of Fig. 3. Fig. 5 is a detail section in elevation on the line $c$—$c$ of Fig. 2. Fig. 6 is a detail section on the line $d$—$d$ of Fig. 2.

In the drawings A indicates a drive shaft which may be driven from any suitable source of power, and B represents the shaft to be driven. Rigidly mounted on the drive shaft A is a fly-wheel 2 formed with an overhanging rim portion, on the inner periphery of which a series of tapered or conical clutch members $e$—$f$ and $g$ is formed. The outer end of the drive shaft A is journaled in a bearing carried on the end of the driven shaft B at a point adjacent the hub portion of the fly-wheel 2. Slidably mounted on the end of the driven shaft B, and splined thereon to revolve therewith, is a disk 3 having a tapered peripheral edge formed to correspond with the clutch member $e$ on the fly-wheel 2 and normally out of contact therewith. Carried by the disk 3 is an inturned flange 4, which extends into an annular channel formed on a sleeve 5, slidably mounted on the hub of the fly-wheel 2; antifriction thrust bearings 6 being interposed between the inside of the flange 4 and the edge of the annular channel. The sleeve 5 is formed with an outwardly extending flange 7 on which a series of pins 8 is carried, which pins extend through the arms or ribs of the fly-wheel 2 and are connected at their outer ends to a sleeve 9, slidably mounted on the reduced portion of the hub of the fly-wheel 2. The sleeve 9 is formed with an annular channel in which a strap 10 is slidably mounted; the strap 10 being connected to a yoke 11, on a shifting lever 12, pivoted at 13. The lever 12 is normally so positioned by a cam plate or bar 14 as to retain the sleeve 9 in such position that the clutch member 3 will be disposed out of contact with the clutch member $e$. Helical springs 15 are wound on the pins 8 and bear between the outer face of the ribs of the fly-wheel and the inner face of the sleeve 9; the springs 15 operating on the release of the lever 12 to shift the sleeves 5 and 9 in such manner as to throw the clutch member 3 into frictional engagement with the clutch member $e$. When the clutch members 3 and $e$ are engaged, rotary motion will be transmitted direct from the drive shaft A to the driven shaft B. Revolubly mounted on the driven shaft B is a sleeve 16, having one end bearing against a shoulder adjacent the end of the shaft B and the other end attached to a pinion 17 on the shaft B. Splined on the sleeve 16, to rotate therewith and slidable longitudinally thereof, is a clutch member 18, the periphery of which is beveled and disposed adjacent the clutch $f$ on the fly-wheel 2.

Connecting with the clutch member 18 are bars 19 which extend lengthwise of the sleeve 16 in channels formed in the latter, and are attached to a sleeve 20 slidable on the sleeve 16. A strap 21 encircles the sleeve 20 and connects with a yoke 22 on a lever 23 fulcrumed at 24, which lever is normally positioned by the cam plate 14 in such manner as to hold the clutch member 18 out of contact with the clutch member $f$. Formed on the sleeve 16, adjacent the clutch member 18, is a flange 25, carrying pins 25', which extend through the clutch member 18 and are formed with flanged outer ends, between which flanged outer ends and the clutch member 18 helical springs 26 bear in such manner as to operate when the lever 23 is released to move the clutch member 18 into frictional engagement with the clutch member $f$. When this occurs, the pinion 17 will be rotated through the clutch members 18 and $f$ on the fly-wheel 2. Revolubly mounted on the sleeve 16 is a sleeve 27 which is held against lengthwise movement and is formed with a pinion 28 on one of its ends, and with a flange 29 on its opposite end. Splined on the sleeve 27 is a clutch member 30, the outer periphery of which is beveled and is disposed adjacent the clutch member $g$ on the fly-wheel 2. A strap 31, loosely mounted in a channel formed on the hub of the clutch member 30, is attached to a yoke 32, on a lever 33, pivoted at 34; which lever is normally so disposed by the cam bar 14 as to retain the clutch member 30 out of engagement with the clutch member $g$. Helical springs 35, wound on pins 35', carried by the flange 29, bear against flanges on the outer ends of pins 35' and the clutch member 30 in such manner as to operate when the lever 33 is released to throw the clutch member 30 into frictional engagement with the clutch member $g$ in the fly-wheel 2. When this occurs, the pinion 28 will be rotated in unison with the fly-wheel 2. Keyed on the shaft B, adjacent the pinion 17, is a disk which is formed with a frictional clutch member 37 at its outer periphery and with a toothed clutch member 38 adjacent the shaft B. Loosely mounted on the shaft B, to be revoluble and slidable thereon, is a sleeve 39 having teeth 40 formed on one of its ends, adapted to engage the toothed clutch member 38 on the shaft B. The sleeve 39 is designed to be reciprocated by means of a lever 41, fulcrumed at 42, having a yoke 43 connected with a strap 44, loosely mounted in an annular channel on the sleeve 39. Splined on the sleeve 39, adjacent its toothed end, is a friction clutch member 45, which is normally held in engagement with the clutch member 27 by means of springs 46, wound on the pins 47, carried by a flange 48, rigid on the sleeve 39; the springs 46 bearing between the flange 48 and the clutch member 45. The lever 41 is normally disposed in such position by means of a spring 41' that the clutch members 37 and 38 will be engaged by the clutch member 45 and the teeth 40 on the sleeve 39. The lever 41 is adapted to be operated by the cam bar 14 in opposition to the spring 41' to move the clutch members 30 and 45 out of engagement with the clutch members 37 and 38. Splined on the sleeve 39 is a toothed wheel 49, which is adapted to be shifted longitudinally on the sleeve 39 by means of a lever 50, fulcrumed at 51, and formed with a yoke 52 connected to a strap 53, loosely mounted in a channel on the hub portion of the toothed wheel 49. The lever 50 is normally disposed in such position by means of a spring 50' as to retain the gear 49 in mesh with a pinion 54, keyed to a counter shaft 55, paralleling the driven shaft B; the lever 50 being adapted to be operated by the cam bar 14 in opposition to the spring 50' in such manner as to shift the toothed wheel 49 and move it out of mesh with the pinion 54 and into mesh with an idler pinion 56, meshing with a pinion 57 on the countershaft 55. Loosely mounted on the countershaft 55 is a pair of gears 58 and 59 which are in constant mesh with the pinions 28 and 17, respectively. Splined on the shaft 55, between the gears 58 and 59, is a sleeve 60, having teeth formed on its opposite ends adapted to mesh with corresponding teeth formed on the hubs of the gears 58 and 59. The sleeve 60 is designed to be reciprocated by means of a lever 61, fulcrumed at 62, having a yoke 63 at its outer end and engaging a strap 64 on the sleeve 60; the lever 61 being operated when it is desired to move the sleeve 60 into engagement with either of the gears 58 or 59. When the parts are disposed in the position shown in the drawings, rotary movement of the drive shaft A will not be transmitted to the driven shaft B, for the reason that the clutch members 3—18 and 30 are out of engagement with the clutch members $e$—$f$ and $g$ on the fly-wheel 2.

In the operation of the invention when it is desired to rotate the driven shaft B at a slow speed in relation to the drive shaft A, the bar 14 is reciprocated in any suitable manner in the direction of the arrow $h$ in Fig. 1, thereby causing the outer end of the lever 23 to move into a notch or depression 65 on the bar 14. This allows the springs 26 to actuate the clutch member 18 and move it into engagement with the clutch member *f* on the fly-wheel 2, so that rotary motion will be transmitted from the fly-wheel through the clutch members *f* and 18, sleeve 16, pinion 17, toothed wheel 59, sleeve 60, countershaft 55, pinion 54, toothed wheel 49, sleeve 39, clutch members 38 and 40, to the shaft B. By continuing the movement of the bar 14 in the direction of the arrow *h* in Fig. 1, the lever 23 will ride out of the depression 65 in the bar so as to retract the clutch member 18 and throw it out of engagement with the clutch member *f*. The lever 33 will then move into a depression 66 on the bar 14, thereby permitting the springs 35 to operate on the clutch member 30 and move the latter into engagement with the clutch member *g* on the fly-wheel 2. Rotary motion will then be transmitted from the shaft A and fly-wheel 2 through the clutch members *g* and 30, sleeve 27, gears 28 and 58, sleeve 60, countershaft 55, gears 54 and 49, sleeve 39 and clutch members 40 and 38 to the driven shaft B; the sleeve 60 being previously moved on the countershaft 55 by the operation of the lever 61 to throw it into locking engagement with the gear wheel 58. The speed of the driven shaft B in relation to the drive shaft A when the clutch members 30 and *g* are thrown into engagement, as just described, will be a speed intermediate the slow speed and the direct drive.

When it is desired to drive direct to the driven shaft B, the movement of the bar 14 is continued in the direction of arrow *h* in Fig. 1, so as to cause the lever 33 to ride out of the depression 66 and thereby throw the clutch member 30 out of engagement with the clutch member *g* and at the same time cause the lever 12 to ride into a depression 67 on the bar 14. When this occurs, the springs 15 will operate to throw the clutch member 3 into engagement with the clutch member *e* on the fly-wheel 2, so that rotary motion will be transmitted through the clutch members *e* and 3 directly to the driven shaft B. In moving the bar 14 to the position last described, the lever 41 will be operated by riding over a cam face 68 on the bar 14 in such manner as to move the sleeve 39 lengthwise of the shaft B and thereby withdraw the teeth 40 thereon out of engagement with the clutch teeth 38, and at the same time move the clutch member 45 out of engagement with the clutch member 37. This operation of the lever 41 acts to throw the toothed wheel 49 out of operable connection with the driven shaft B, thereby permitting rotation of the latter when connected directly to the drive shaft A without affecting the countershaft 55 and its connected parts. On reversing the movement of the bar 14 the clutch member 3 will be moved out of engagement with the clutch member *e* and the clutch members 18 and 30 thrown in and out of engagement with the clutch members *f* and *g* in their progressive order, to restore the parts to their neutral position. When it is desired to reverse the direction of rotation of the driven shaft B, the bar 14 is moved in the direction of the arrow *i* in Fig. 1, from the neutral position shown in the drawings. This action causes the lever 50 to ride over an inclined face 69 on the bar 14, which acts to rock the lever 50 and shift the gear 49 out of engagement with the pinion 54 and move it into engagement with the idler pinion 56. The lever 23 will be actuated simultaneous with the operation of the lever 50 by reason of its outer end entering a depression 70 on the bar 14, so as to throw the slow speed clutch member 18. Rotary motion will then be transmitted to the driven shaft B on the slow speed only in a direction of rotation reverse to that of the drive shaft A. In restoring the bar 14 to its normal position the gear 49 will be actuated by the lever 50, through the medium of the spring 50', to restore it into engagement with the pinion 54. On restoring the sleeve 39 to its normal position, on changing from the direct drive to the intermediate speed, the clutch member 45 will engage the clutch member 37 before the teeth 40 mesh with the teeth 38; frictional engagement of the clutch members 37 and 45 serving to prevent shock on the engaging of the toothed clutch members 38 and 30. By operating the lever 61 the sleeve 60 will be shifted on the countershaft 55 so as to throw it into engagement with either of the toothed wheels 58 or 59. By this arrangement the rotation of the countershaft 55 through one of the gears 58 or 59 will not affect the other gear and its connections.

While I have shown the invention as adapted for use in three-speed transmission and reverse, it is manifest that the number of speeds may be increased or diminished as occasion requires by increasing or diminishing the number of clutch members engageable with the fly-wheel 2. It is also obvious that while I have shown and described conical clutch members, any other type of friction clutch may be substituted therefor.

Having thus described my invention, what I claim and desire to secure by Letters Patent is:

1. In combination with a drive shaft and a driven shaft, and a series of clutch members on the drive shaft, a clutch member on the driven shaft for engagement with one of the clutch members of the drive shaft, a sleeve on the driven shaft, a pinion thereon, a clutch member splined to the sleeve for engagement with another of the clutch members of the drive shaft, longitudinal bars connected to said clutch member of the sleeve, a second sleeve slidable on the first named sleeve and connected to said bars, a third sleeve revolubly mounted on the first sleeve, means to prevent longitudinal movement of the third sleeve, a clutch member splined on the third sleeve for engagement with another of the drive shaft clutch members, a pinion on said third sleeve, a countershaft, a loose gear thereon in mesh with the pinion of the third sleeve, a second loose gear on the countershaft in mesh with the pinion of the first sleeve, a clutch member splined on the countershaft to engage either of the gears of the latter, a fourth sleeve on the driven shaft, a toothed wheel splined thereon and a clutch member on said sleeve, a clutch member on the driven shaft to engage the clutch member of the fourth sleeve, a pinion on the countershaft to engage the toothed wheel of the fourth sleeve, and means to actuate all of the clutches.

2. In combination with a driven shaft and a drive shaft, a plurality of clutch members on the drive shaft, a clutch member carried by the driven shaft and rotatable therewith, a sleeve carried by the driven shaft and free to rotate thereon, a clutch member carried by one end of said sleeve and a pinion rigid on the other end of said sleeve, a second sleeve rotatable on the first mentioned sleeve, a clutch member adapted to engage one of the clutch members of the drive shaft keyed to the second sleeve, a pinion rigid on the second sleeve, a countershaft, a pair of gears loosely carried by the countershaft one of said gears meshing with the pinion on the first mentioned sleeve, the other gear meshing with the pinion on the last mentioned sleeve, means between the gears and slidably mounted on the countershaft for connecting either gear thereto, a third sleeve rotatably mounted on the driven shaft and having a clutch face, a clutch member keyed to the driven shaft, a pinion keyed to the third mentioned sleeve, a pinion on the countershaft meshing with the last named pinion, and means to connect either of the two first mentioned clutch members to the clutch members of the drive shaft to drive the driven shaft through the medium of said countershaft.

3. In combination with a driven shaft and a drive shaft, a plurality of clutch members on the drive shaft, a clutch member carried by the driven shaft and rotatable therewith, a sleeve carried by the driven shaft and free to rotate thereon, a clutch member carried by one end of said sleeve and a pinion rigid on the other end of said sleeve, a second sleeve rotatable on the first mentioned sleeve, a clutch member adapted to engage one of the clutch members of the drive shaft keyed to the second sleeve, a pinion rigid on the second sleeve, a countershaft, a pair of gears loosely carried by the countershaft one of said gears meshing with the pinion on the first mentioned sleeve, the other gear meshing with the pinion on the last mentioned sleeve, means between the gears and slidably mounted on the countershaft for connecting either gear thereto, a third sleeve rotatably mounted on the driven shaft, a pinion keyed to the third sleeve intermediate its ends, a pinion on the countershaft meshing with the pinion on the third sleeve, means for connecting either of the clutch members carried by the first two mentioned sleeves with one of the clutch members of the drive shaft, means for connecting the proper pinion to the counter shaft and means for connecting the third mentioned sleeve to the driven shaft to drive same from said countershaft.

4. In combination with a driving shaft and a driven shaft, gears on the driven shaft, a countershaft, a pair of pinions loosely mounted on the countershaft, said pinions meshing with the respective gears on the driven shaft, means for connecting the driven shaft to the drive shaft, means for connecting either of said loose pinions to the counter shaft, and means to disconnect both of said loose pinions from the counter shaft upon operation of the means to connect the driven shaft to the drive shaft.

In testimony whereof I have hereunto set my hand in the presence of two subscribing witnesses.

JOHN J. CAMPODONICO.

Witnesses:
JOHN H. HERRING,
W. W. HEALEY.